United States Patent
Harwani et al.

(10) Patent No.: US 11,611,898 B2
(45) Date of Patent: Mar. 21, 2023

(54) SLOW ENODEB/HNB IDENTIFICATION AND IMPACT MITIGATION

(71) Applicant: Parallel Wireless, Inc., Nashua, NH (US)

(72) Inventors: Sanjay Harwani, Pune (IN); Kartik Raval, Pune (IN); Anoop Gupta, Pune (IN)

(73) Assignee: Parallel Wireless, Inc., Nashua, NH (US)

( * ) Notice: Subject to any disclaimer, the term of this patent is extended or adjusted under 35 U.S.C. 154(b) by 244 days.

(21) Appl. No.: 17/152,324

(22) Filed: Jan. 19, 2021

(65) Prior Publication Data

US 2021/0227421 A1 Jul. 22, 2021

Related U.S. Application Data

(60) Provisional application No. 62/962,452, filed on Jan. 17, 2020.

(51) Int. Cl.
*H04W 28/02* (2009.01)
*H04W 28/08* (2023.01)
*H04W 24/02* (2009.01)

(52) U.S. Cl.
CPC ....... *H04W 28/0247* (2013.01); *H04W 24/02* (2013.01); *H04W 28/0289* (2013.01); *H04W 28/0808* (2020.05)

(58) Field of Classification Search
CPC ............. H04W 28/0247; H04W 24/02; H04W 28/0289; H04W 28/0808; H04W 24/08; H04W 92/12; H04W 28/00–04; H04L 47/50; H04L 47/6215; H04L 47/00–70
See application file for complete search history.

(56) References Cited

U.S. PATENT DOCUMENTS

| 6,993,018 B1 * | 1/2006 | Horlin | H04L 49/901 370/412 |
| 2022/0030308 A1 * | 1/2022 | Bentaleb | H04N 21/8456 |

OTHER PUBLICATIONS

Kong: "Design Concept for a Failover Mechanism in Distributed SDN Controllers", Spring 2017, SJSU ScholarWorks.
Nguyen et al.: "ECHO: A reliable distributed cellular core network for hyper-scale public clouds", University of Utah, Microsoft Research, Core Network Dynamics, Oct. 29-Nov. 2, 2018.
Digital cellular telecommunications system (Phase 2+); Universal Mobile Telecommunications System (UMTS); LTE; Telecommunication management; Charging management; Diameter charging applications (3GPP TS 32.299 version 12.6.0 Release 12) (Oct. 2014).

* cited by examiner

Primary Examiner — Ronald Eisner
(74) Attorney, Agent, or Firm — Michael Y. Saji; David W. Rouille

(57) ABSTRACT

A method and computer readable medium for identifying slow base stations and providing impact mitigation are described. In one embodiment, the method includes detecting that a first base station, using a first queue, is slow, wherein a slow base station is a base station that that cannot keep up with the rate at which a core node is generating update messages over a prolonged period; providing a slow base station queue; and moving the first base station from the first queue to the slow base station queue.

20 Claims, 10 Drawing Sheets

SLOW ENODEB/HNB IDENTIFICATION AND IMPACT MITIGATION

CROSS-REFERENCE TO RELATED APPLICATIONS

This application claims priority under 35 U.S.C. § 119(e) to U.S. Provisional Pat. App. No. 62/962,452, filed Jan. 17, 2020, titled "Slow eNodeB/HNB Identification and Impact Mitigation" which is hereby incorporated by reference in its entirety for all purposes. The present application hereby incorporates by reference in their entirety each of the following U.S. Pat. App. Pub. Nos. US20110044285, US20140241316; WO Pat. App. Pub. No. WO2013145592A1; EP Pat. App. Pub. No. EP2773151A1; U.S. Pat. No. 8,879,416, "Heterogeneous Mesh Network and Multi-RAT Node Used Therein," filed May 8, 2013; U.S. Pat. No. 8,867,418, "Methods of Incorporating an Ad Hoc Cellular Network Into a Fixed Cellular Network," filed Feb. 18, 2014; U.S. patent application Ser. No. 14/777,246, "Methods of Enabling Base Station Functionality in a User Equipment," filed Sep. 15, 2016; U.S. patent application Ser. No. 14/289,821, "Method of Connecting Security Gateway to Mesh Network," filed May 29, 2014; U.S. patent application Ser. No. 14/642,544, "Federated X2 Gateway," filed Mar. 9, 2015; U.S. patent application Ser. No. 14/711,293, "Multi-Egress Backhaul," filed May 13, 2015; U.S. Pat. App. No. 62/375,341, "S2 Proxy for Multi-Architecture Virtualization," filed Aug. 15, 2016; U.S. patent application Ser. No. 15/132,229, "MaxMesh: Mesh Backhaul Routing," filed Apr. 18, 2016, each in its entirety for all purposes. This application also hereby incorporates by reference in their entirety each of the following U.S. Pat. applications or Pat. App. Publications: US20150098387A1 (PWS-71731US01); US20170055186A1 (PWS-71815US01); US20170273134A1 (PWS-71850US01); US20170272330A1 (PWS-71850US02); and Ser. No. 15/713,584 (PWS-71850US03). This application also hereby incorporates by reference in their entirety U.S. patent application Ser. No. 16/424,479, "5G Interoperability Architecture," filed May 28, 2019; and U.S. Provisional Pat. Application No. 62/804,209, "5G Native Architecture," filed Feb. 11, 2019.

BACKGROUND

In today's telecom networks, the concept of perfect backhaul is slowly going away. The radio nodes that broadcast over the air (like LTE eNodeB or 3G HNB) are deployed in huge numbers over a non-fiber backhaul to save costs. Also, with the advent of cloud RAN, many functions are deployed at centralized location rather than on the radio node. This exposes the non-ideal link and the protocols running over it to the practical issues like congestion, delays and packet drops. The bandwidth provided to the users have increased dramatically over time and hence the radio nodes are also always fully loaded in urban environments.

The protocols that run on the backhaul link need to be capable to detect and avoid congestion. SCTP is one such protocol primary used. It provides a congestion window per SCTP association and therefore limit the number of packets to buffer until on a slow link/peer responds. However, a core network node terminates thousands of eNodeB connections. The SCTP server functionality is practically implemented such that many resources are shared between the thousands of associations. It is impractical to 'reserve' resources required for each association.

SUMMARY

A mechanism is hereby disclosed to identify a slow eNodeB/HNB and provide a way to mitigate the impact on overall system. This document provides multiple ways to identify slow eNodeB/HNB. Once identification is done, it also provides a mechanism to mitigate the impact of slow eNodeB/HNB.

A method for identifying slow base stations and providing impact mitigation is presented. In one embodiment, the method includes detecting that a first base station, using a first queue, is slow; providing a slow base station queue; and moving the first base station from the first queue to the slow base station queue.

DETAILED DESCRIPTION

Figure 1:
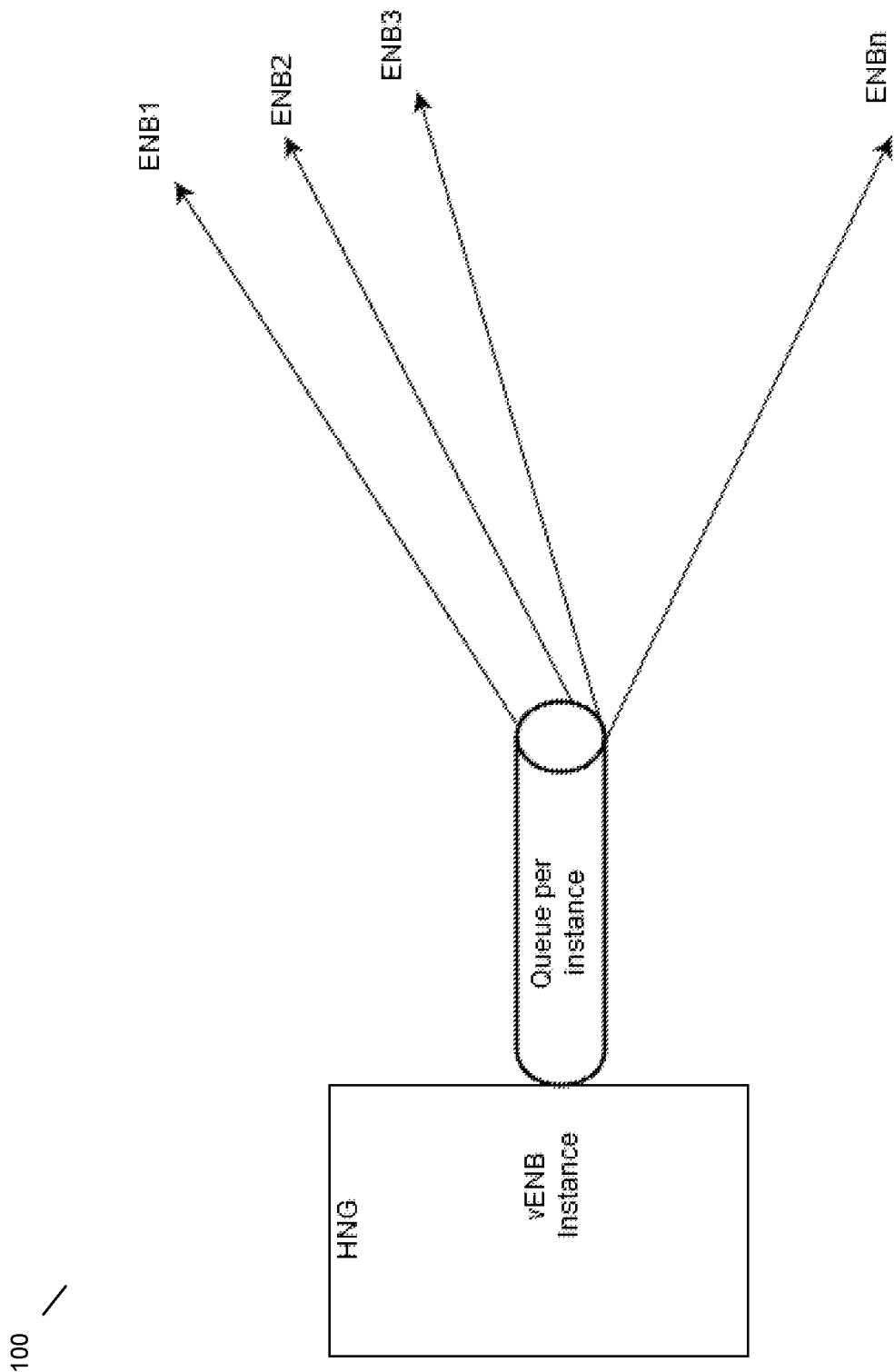
FIG. 1 is a block diagram showing an environment wherein no ENB is identified as slow.

For simplicity, the document from here-on has references to eNodeB, however all the details are applicable to base stations, including HNBs, as well.

A slow eNodeB is an eNodeB that cannot keep up with the rate at which core node is generating update messages over a prolonged period. There are multiple reasons for an eNodeB to exhibit this problem. These include:

There is packet loss on the link to the eNodeB (backhaul).

Throughput of the link to the eNodeB (backhaul) is very low as compared to the traffic it's receiving.

The eNodeB is heavily loaded in terms of CPU usage and cannot service the SCTP connection at the required frequency.

When a slow eNodeB is present, the packet queue in the core node starts getting built up. The resources to build the queue are shared amongst hundreds or thousands of associations. Although there is a limit to what each association can use from this shared pool, the practical possibility is that the shared pool gets exhausted when a few links start having issues. Then it starts affecting all the associations that share this pool. The system can recover when the bad links become good and consume the messages with appropriate acknowledgements, however by that time lot of damage could have been done and also the damage is wide-spread. Alternatively, the core node may drop the associations with sustained high watermark usage.

Slow eNodeB Detection

The first part of solving the slow eNodeB problem is to be able to detect that the eNodeB is slow and be able to detect that the eNodeB is no longer slow.

A full or nearly full message queue.

Indication that the messages sent to this eNodeB are getting queued up.

A very low number of messages pending for other eNodeBs.

Round trip time (RTT) to this eNodeB is unusually high.

These symptoms must persist for some time for us to mark the eNodeB as really slow and it's not a transient situation.

When these symptoms go away for a sufficiently long period of time the slow eNodeB can be considered to have recovered and is no longer slow.

Reacting to a Slow eNodeB.

The mechanism to address the slow eNodeB problem is the splitting of the affected queue. The goal is to move all the slow eNodeBs out of the main queue and into a new queue dedicated to slow eNodeBs. After this, all the non-slow members in the main queue can progress at their regular pace and catch up with the changes. The slow eNodeBs will still consume updates at the slower pace and lag in their new dedicated queue. The notification would be sent to the application about slow link/peer. The application can take its own decisions to reduce the congestion, e.g. lot of signaling towards the ENodeB consists of paging messages. Once the application knows about state of the peer, it can throttle the paging messages towards it by an appropriate factor. Downlink data towards such ENodeB may also be shaped. Taking these measures would help the peer/link to get back to normalcy faster.

Proposed options to tackle Slow eNodeB.

Static Slow eNodeB.

System would raise an alarm when a given peer/link is congested. Operator can manually choose to act upon the alarm and a Command Line Interface (CLI) would be provided to the operator to move the Slow eNodeB into a separate message queue.

Detection mechanism also would be provided as follows, each of which can be manually configured, in some embodiments, by a network operator:

The SCTP association threshold is breached.

RTT for the SCTP association is unusually large.

Sndwnd is very low for the SCTP association with slow eNodeB.

In some embodiments, a manual configuration may be set to flag an eNodeB as slow and this will create a separate queue for this eNodeB. In some embodiments, if you mark two eNodeBs belonging to the same message group as slow, then these two eNodeBs will be moved into a single slow eNodeB queue. The advantage here is that there is a limit to the overhead that this feature will create. The drawback is that the slow eNodeB queue will have to progress at the pace of the slowest of the slow eNodeBs.

Dynamic Slow eNodeB

With this option, HNG will monitor the above parameters of the link/peer eNodeBs. When a peer eNodeB is exhibiting the slow link/peer symptoms described above, the HNG will log a message and mark the peer eNodeB as slow.

The default thresholds can be very conservative. In one example, a peer will have to be exhibiting slowness for several minutes to be flagged. Configuration will exist to tune the interval and make the flagging more aggressive.

When a peer recovers HNG will log another message and unmark the eNodeB.

Dynamic Slow eNodeB Protection

This option introduces automatic slow eNodeB protection. (Disabled by default). This option needs the availability of dynamic detection of slow eNodeB. When a slow eNodeB is detected it will automatically be marked as slow and moved into a new slow eNodeB queue. When a slow eNodeB recovery is detected, the peer will be moved back to its original queue; these may be configurable thresholds that may be set by the user or operator, in some embodiments; this may be Disabled by default in some embodiments.

In the diagrams below eNodeB is referred to as ENB. Where an eNodeB is described herein, a 2G base station, 3G NodeB, 5G gNodeB etc. may also be considered to be capable of supporting the presently described features, in some embodiments. Separate slow and regular queues may be used for base stations of another radio access technology (RAT) access network (RAN), in some embodiments, or a single slow queue for all RATs plus a single regular queue for all RATs could be used as well, in some embodiments.

FIG. 1 is a block diagram showing an environment 100 for a normal scenario (no ENB is identified as slow). The environment 100 includes an HNG, a queue, and multiple eNodeBs.

Figure 2:
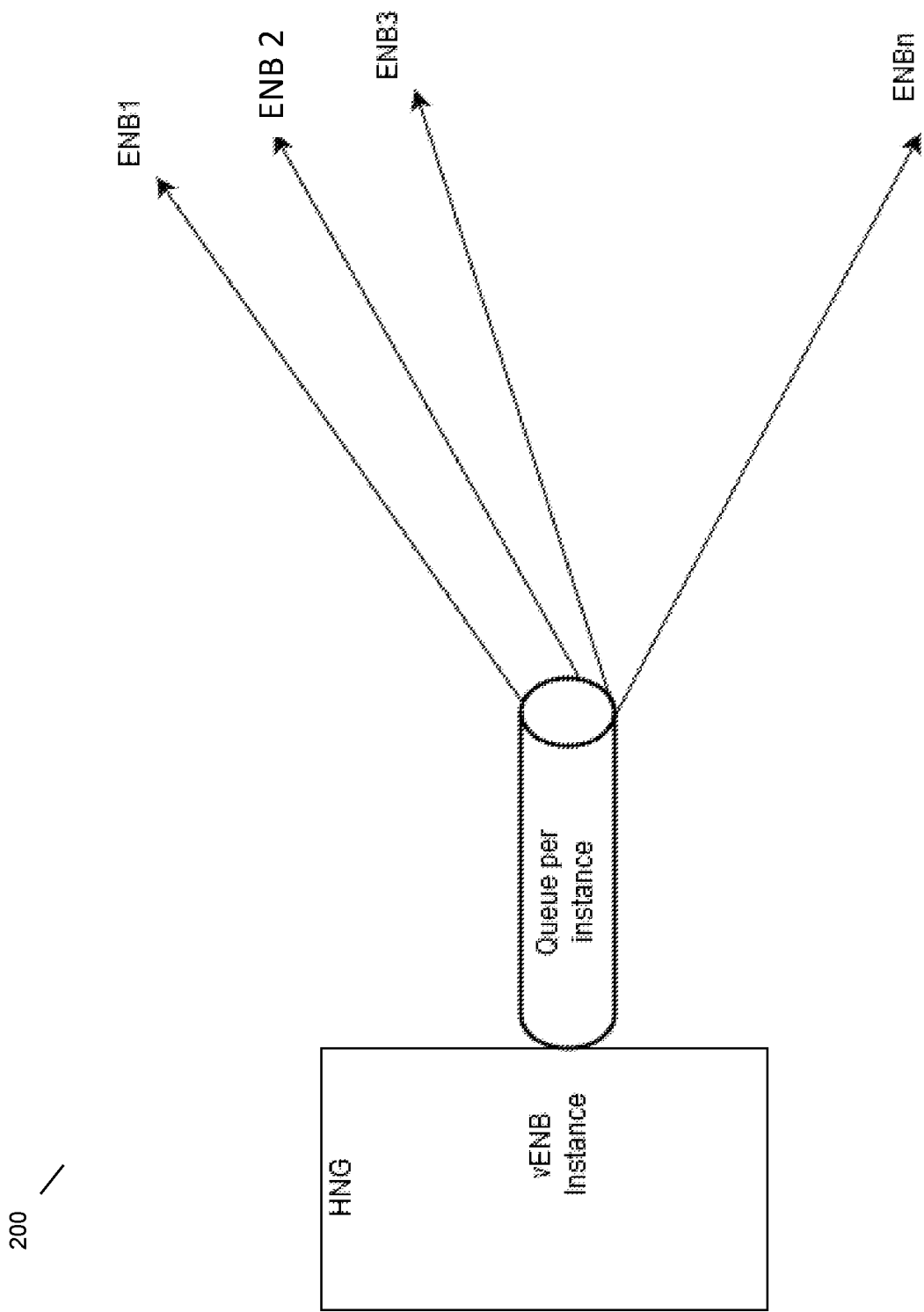
FIG. 2 is a block diagram showing an environment for one slow eNodeB, in accordance with some embodiments.

FIG. 2 is a block diagram showing an environment 200 for one slow eNodeB identified (ENB2). The environment 200 includes an HNG, a queue, and multiple eNodeBs, whereon one EnodeB is slow.

Figure 3:
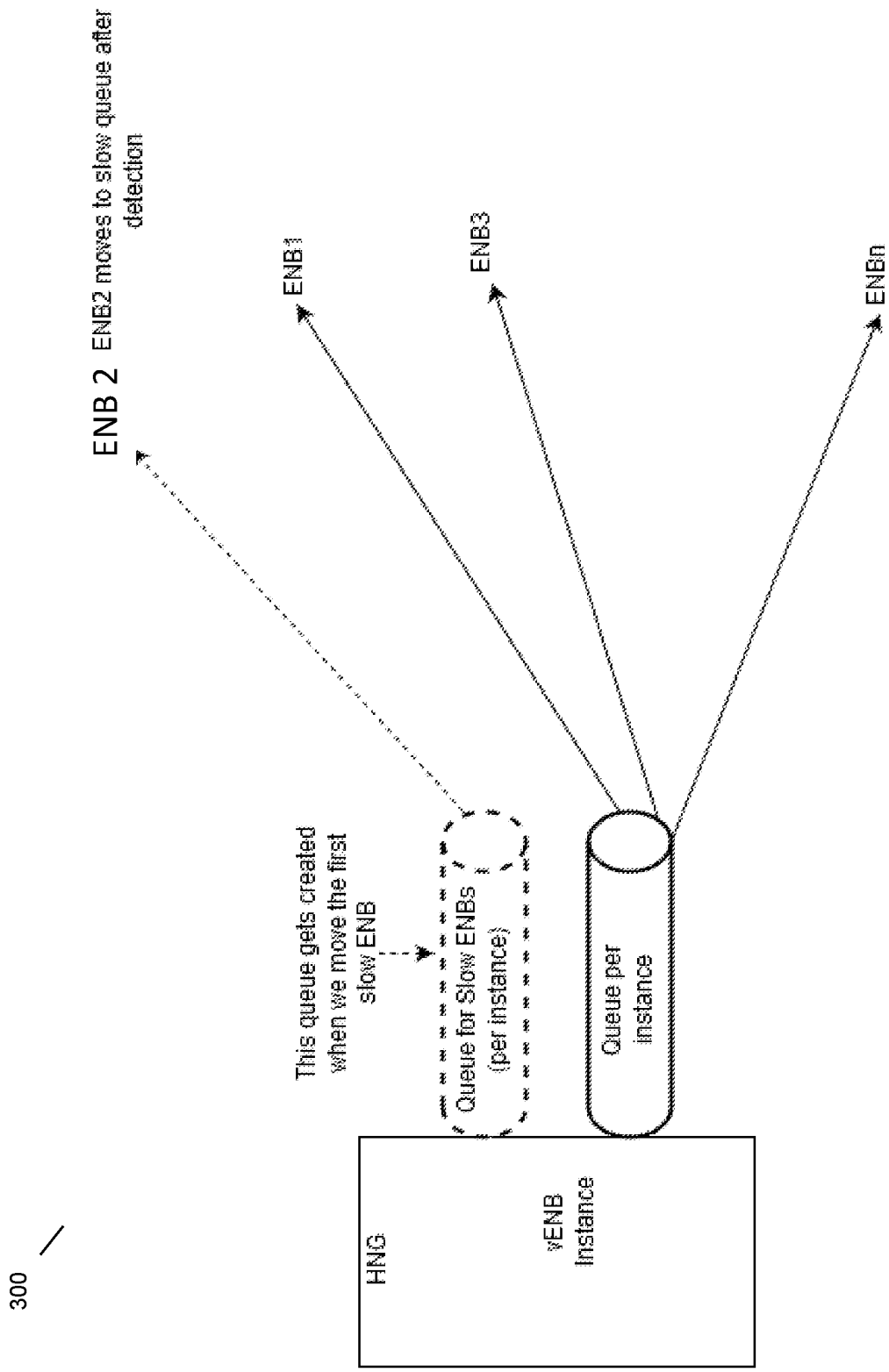
FIG. 3 is a block diagram showing an environment wherein a slow queue is created and identified, in accordance with some embodiments.

FIG. 3 is a block diagram showing an environment 300 wherein a slow queue is created and identified slow eNodeB moved to it (ENB2). The environment 100 includes an HNG, a queue, a slow queue and multiple eNodeBs.

Figure 4:
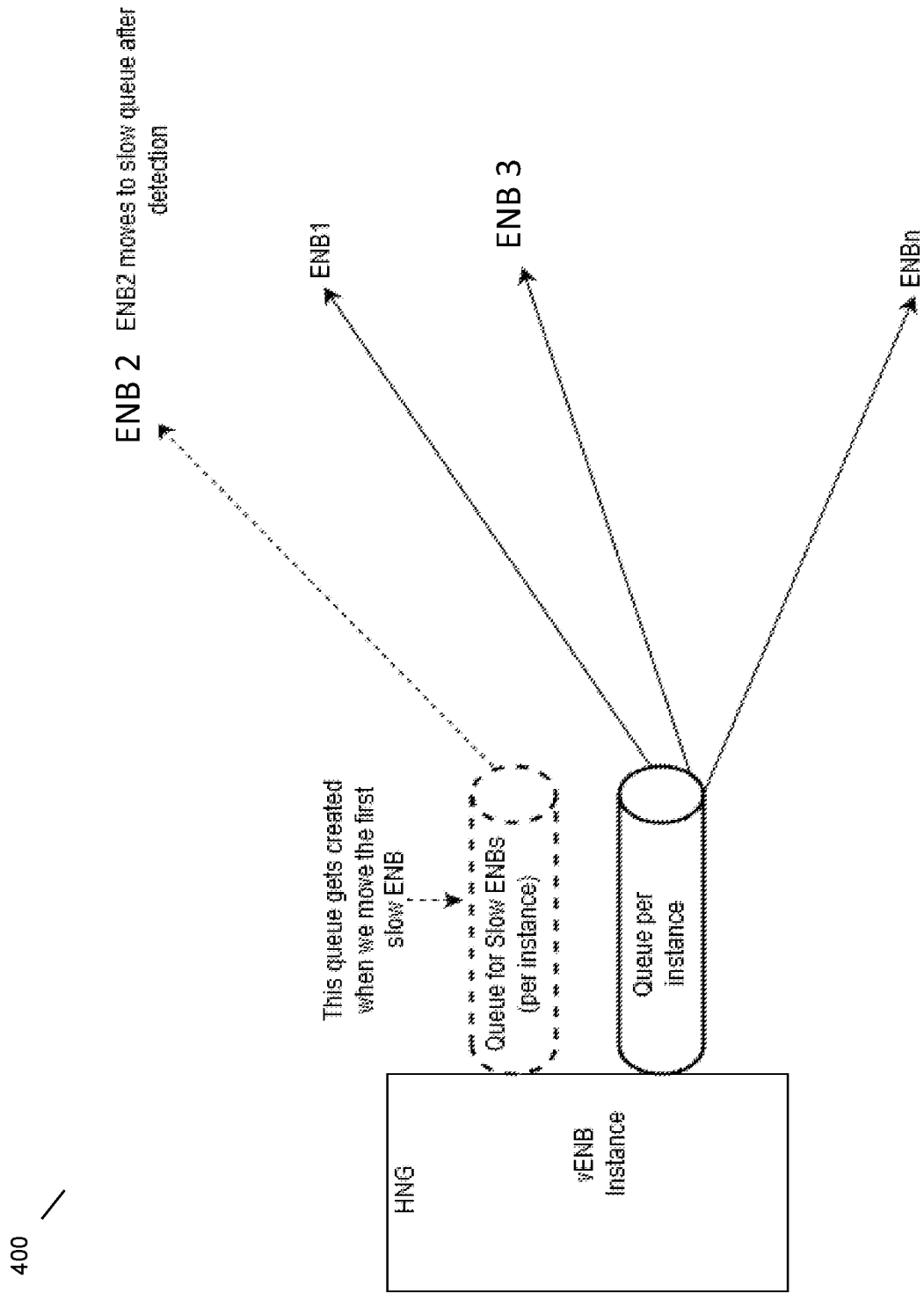
FIG. 4 is a block diagram showing an environment wherein one more slow eNodeB identified, in accordance with some embodiments.

FIG. 4 is a block diagram showing an environment 400 wherein one more slow eNodeB identified (ENB3).

Figure 5:
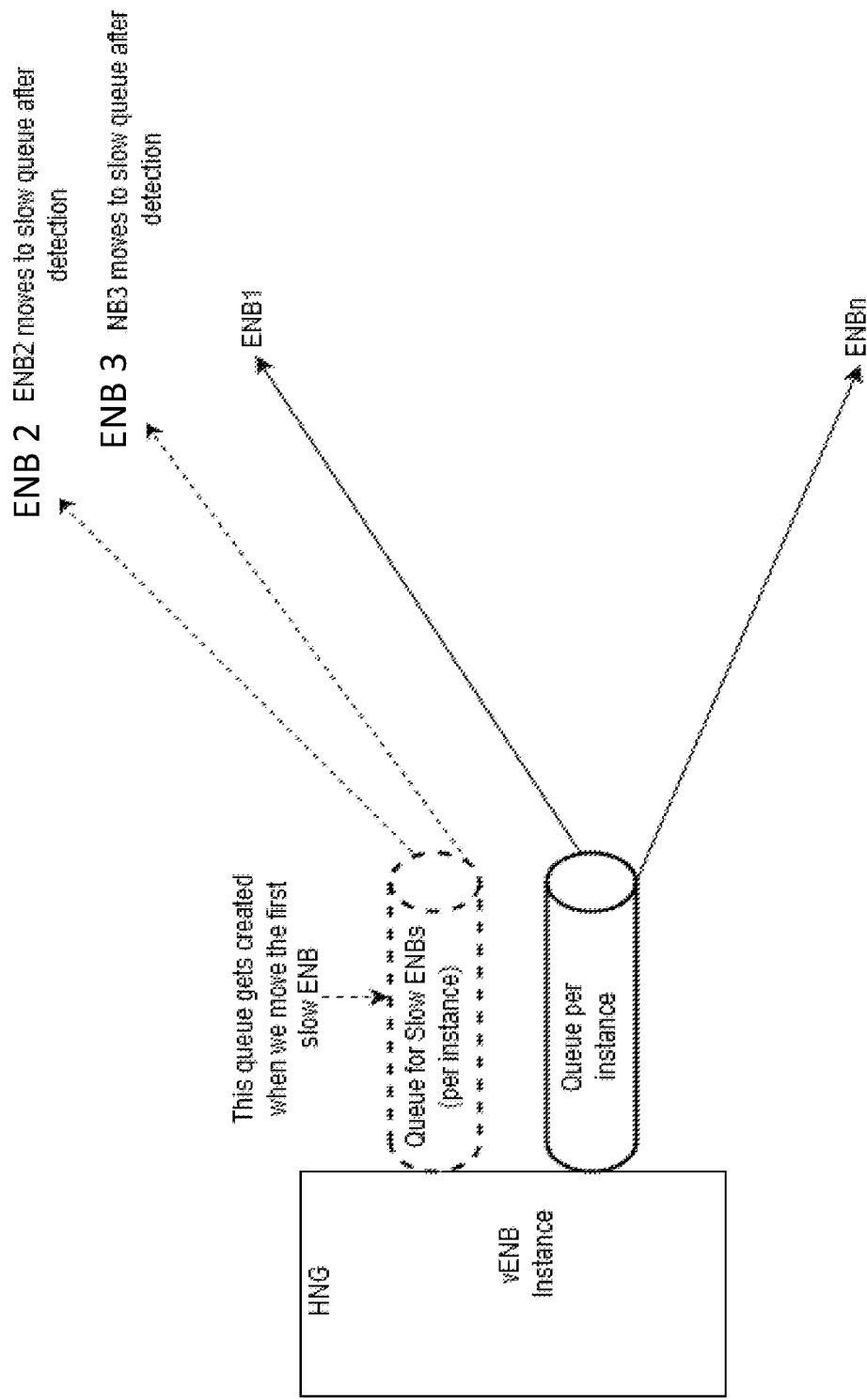
FIG. 5 is a block diagram showing an environment where the other slow eNodeB is also moved to slow queue, in accordance with some embodiments.

FIG. 5 is a block diagram showing an environment 500 where ENB3 also moved to slow queue.

Figure 6:
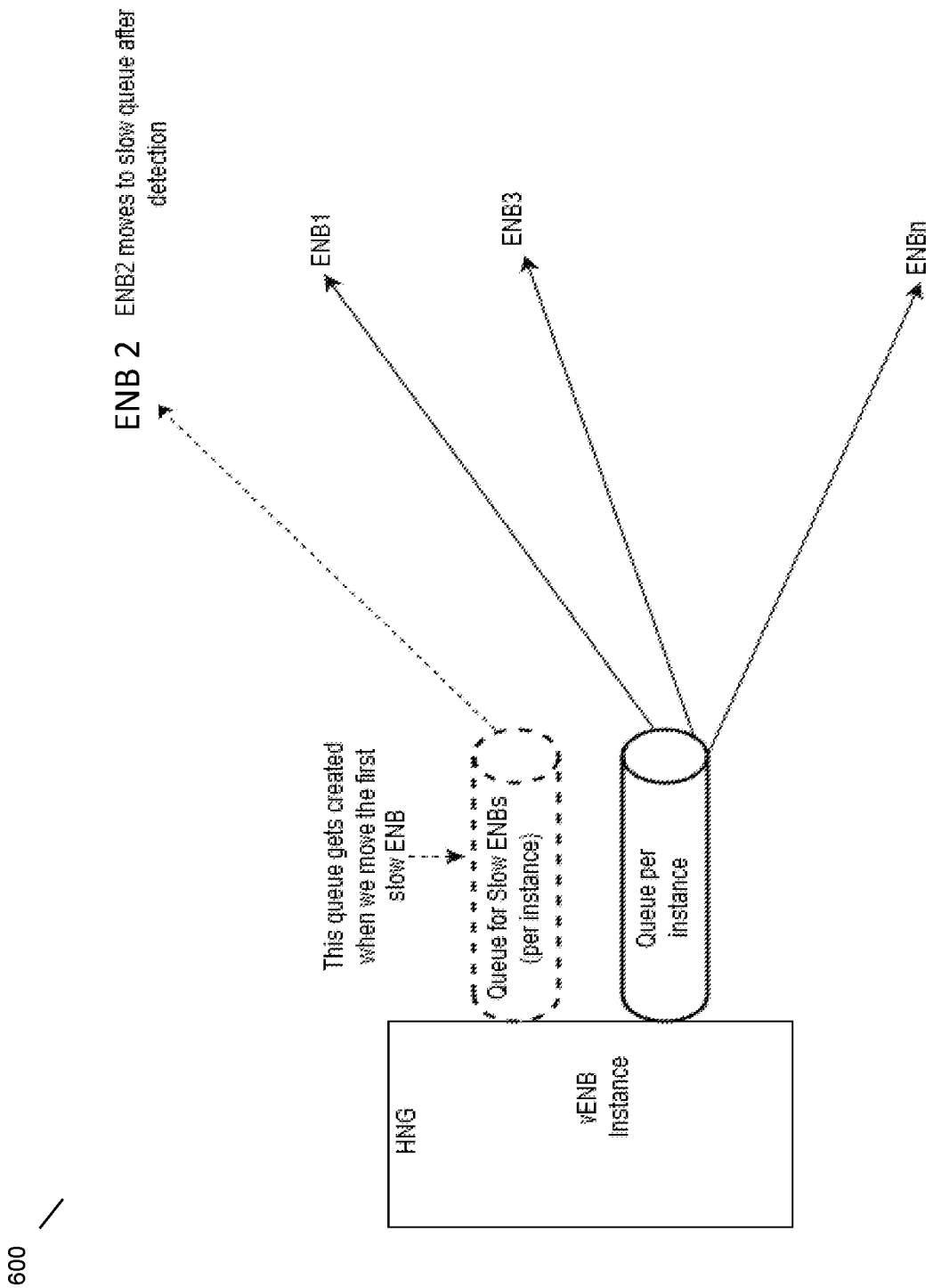
FIG. 6 is a block diagram showing an environment where a slow eNodeB has recovered and comes back to original queue in accordance with some embodiments.

FIG. 6 is a block diagram showing an environment 600 where ENB3 has recovered and comes back to original queue.

Figure 7:
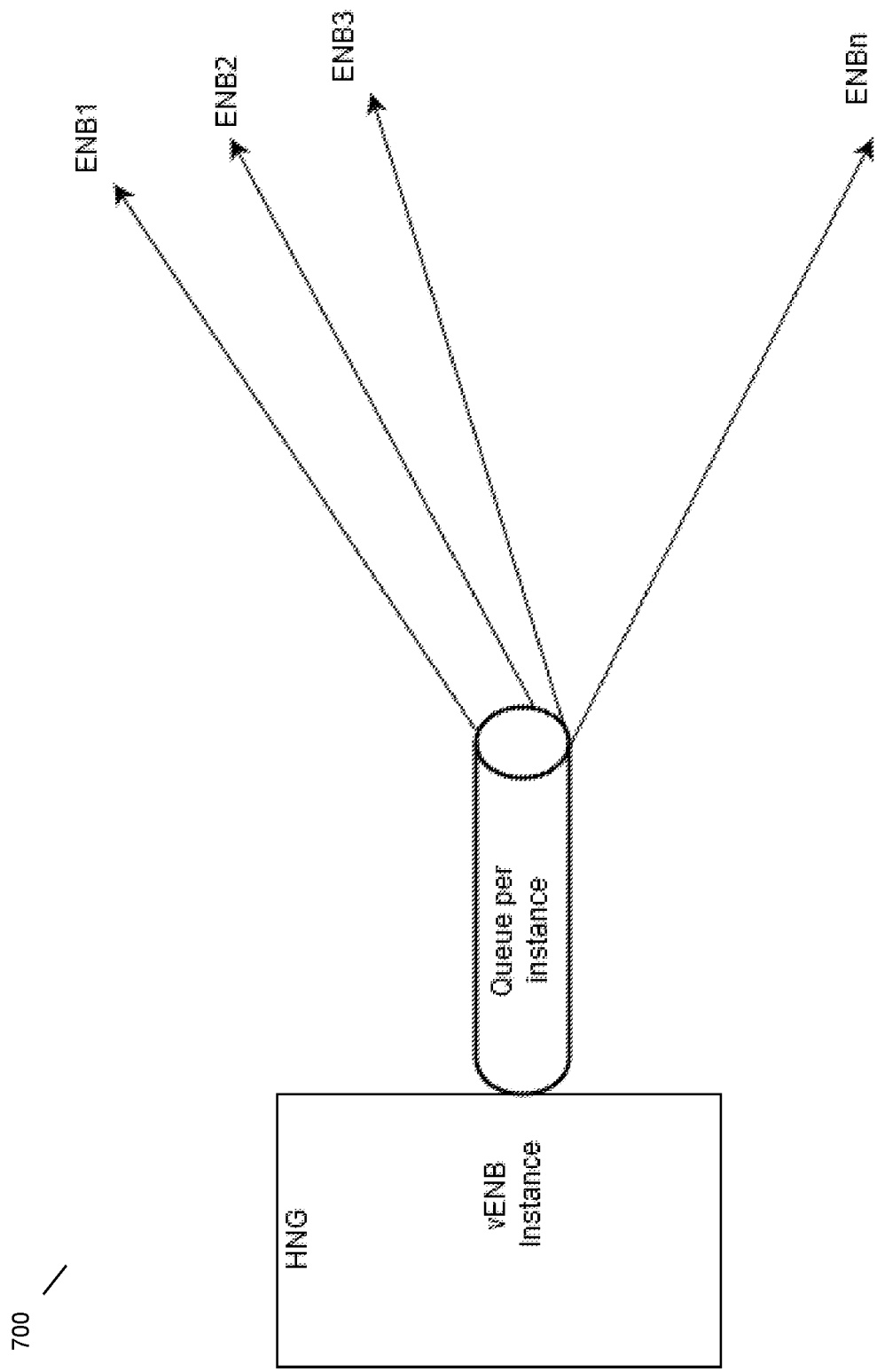
FIG. 7 is a block diagram showing an environment where the other slow eNodeB has also recovered and comes back to the original queue, in accordance with some embodiments.

FIG. 7 is a block diagram showing an environment 700 where ENB2 has also recovered and comes back to the original queue. Since there is no longer any slow eNodeBs, the slow eNodeB queue is also deleted. In some embodiments, queues may be created and destroyed based on traffic requirements. In some embodiments, a slow eNodeB queue is reused without deletion for additional detected eNodeBs.

Figure 8:
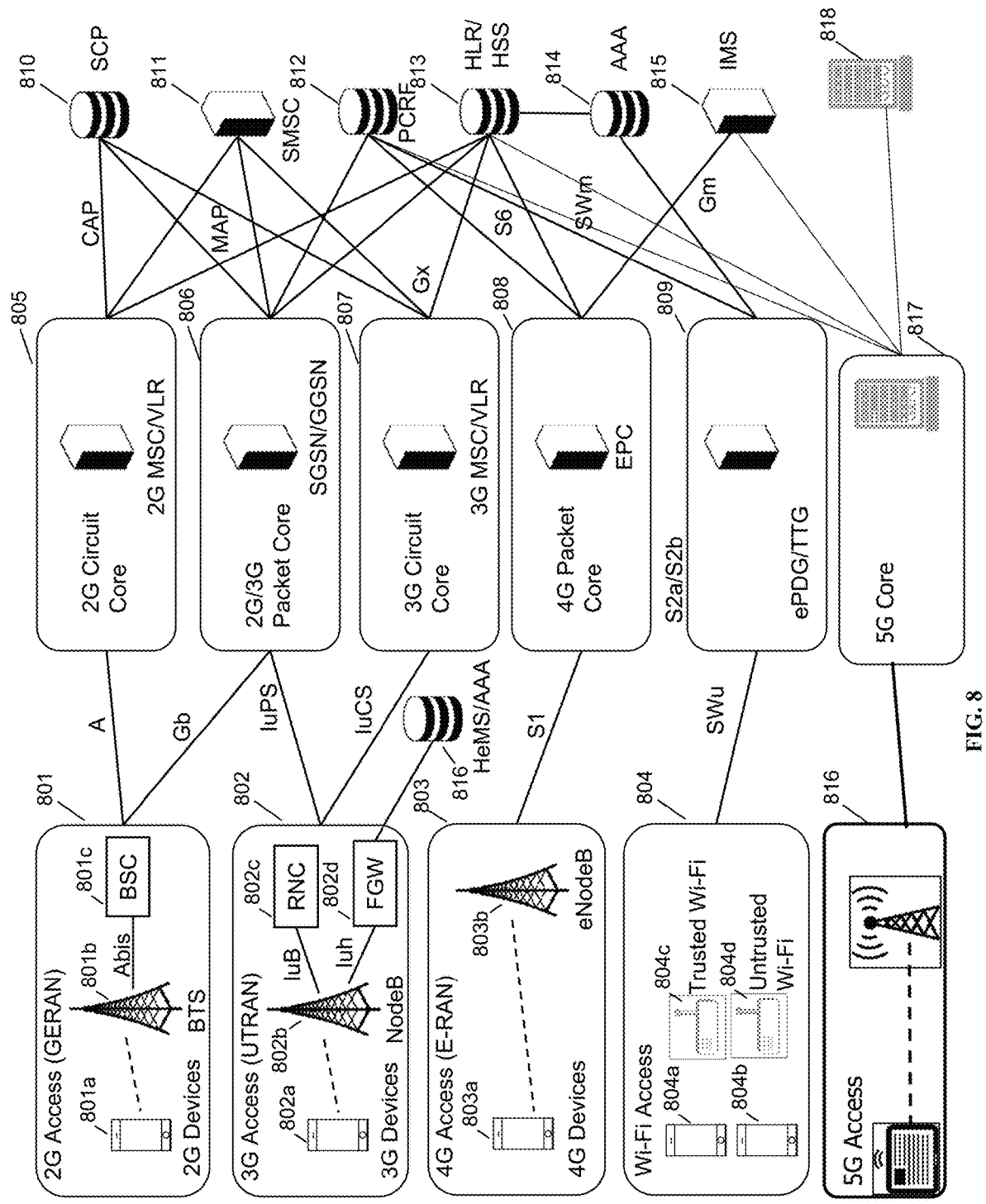
FIG. 8 is a schematic network architecture diagram for various radio access technology core networks.

FIG. 8 is a schematic network architecture diagram for 3G and other-G prior art networks. The diagram shows a plurality of "Gs," including 2G, 3G, 4G, 5G and Wi-Fi. 2G is represented by GERAN 101, which includes a 2G device 801a, BTS 801b, and BSC 801c. 3G is represented by UTRAN 802, which includes a 3G UE 802a, nodeB 802b, RNC 802c, and femto gateway (FGW, which in 3GPP namespace is also known as a Home nodeB Gateway or HNBGW) 802d. 4G is represented by EUTRAN or E-RAN 803, which includes an LTE UE 803a and LTE eNodeB 803b. Wi-Fi is represented by Wi-Fi access network 804, which includes a trusted Wi-Fi access point 804c and an untrusted Wi-Fi access point 804d. The Wi-Fi devices 804a and 804b may access either AP 804c or 804d. In the current network architecture, each "G" has a core network. 2G circuit core network 805 includes a 2G MSC/VLR; 2G/3G packet core network 806 includes an SGSN/GGSN (for EDGE or UMTS packet traffic); 3G circuit core 807 includes a 3G MSC/VLR; 4G circuit core 808 includes an evolved packet core (EPC); and in some embodiments the Wi-Fi access network may be connected via an ePDG/TTG using S2a/S2b. Each of these nodes are connected via a number of different protocols and interfaces, as shown, to other, non-"G"-specific network nodes, such as the SCP 830, the SMSC 831, PCRF 832, HLR/HSS 833, Authentication, Authorization, and Accounting server (AAA) 834, and IP Multimedia Subsystem (IMS) 835. An HeMS/AAA 836 is present in some cases for use by the 3G UTRAN. The diagram is used to indicate schematically the basic functions of each network as known to one of skill in the art, and is not intended to be exhaustive. For example, 5G core 817 is shown using a single interface to 5G access 816, although in some cases 5G access can be supported using dual connectivity or via a non-standalone deployment architecture.

Noteworthy is that the RANs 801, 802, 803, 804 and 836 rely on specialized core networks 805, 806, 807, 808, 809, 837 but share essential management databases 830, 831, 832, 833, 834, 835, 838. More specifically, for the 2G GERAN, a BSC 801c is required for Abis compatibility with BTS 801b, while for the 3G UTRAN, an RNC 802c is required for Iub compatibility and an FGW 802d is required for Iuh compatibility. These core network functions are separate because each RAT uses different methods and techniques. On the right side of the diagram are disparate functions that are shared by each of the separate RAT core networks. These shared functions include, e.g., PCRF policy functions, AAA authentication functions, and the like. Letters on the lines indicate well-defined interfaces and protocols for communication between the identified nodes.

The system may include 5G equipment. 5G networks are digital cellular networks, in which the service area covered by providers is divided into a collection of small geographical areas called cells. Analog signals representing sounds and images are digitized in the phone, converted by an analog to digital converter and transmitted as a stream of bits. All the 5G wireless devices in a cell communicate by radio waves with a local antenna array and low power automated transceiver (transmitter and receiver) in the cell, over frequency channels assigned by the transceiver from a common pool of frequencies, which are reused in geographically separated cells. The local antennas are connected with the telephone network and the Internet by a high bandwidth optical fiber or wireless backhaul connection.

5G uses millimeter waves which have shorter range than microwaves, therefore the cells are limited to smaller size. Millimeter wave antennas are smaller than the large antennas used in previous cellular networks. They are only a few inches (several centimeters) long. Another technique used for increasing the data rate is massive MIMO (multiple-input multiple-output). Each cell will have multiple antennas communicating with the wireless device, received by multiple antennas in the device, thus multiple bitstreams of data will be transmitted simultaneously, in parallel. In a technique called beamforming the base station computer will continuously calculate the best route for radio waves to reach each wireless device, and will organize multiple antennas to work together as phased arrays to create beams of millimeter waves to reach the device.

Figure 9:
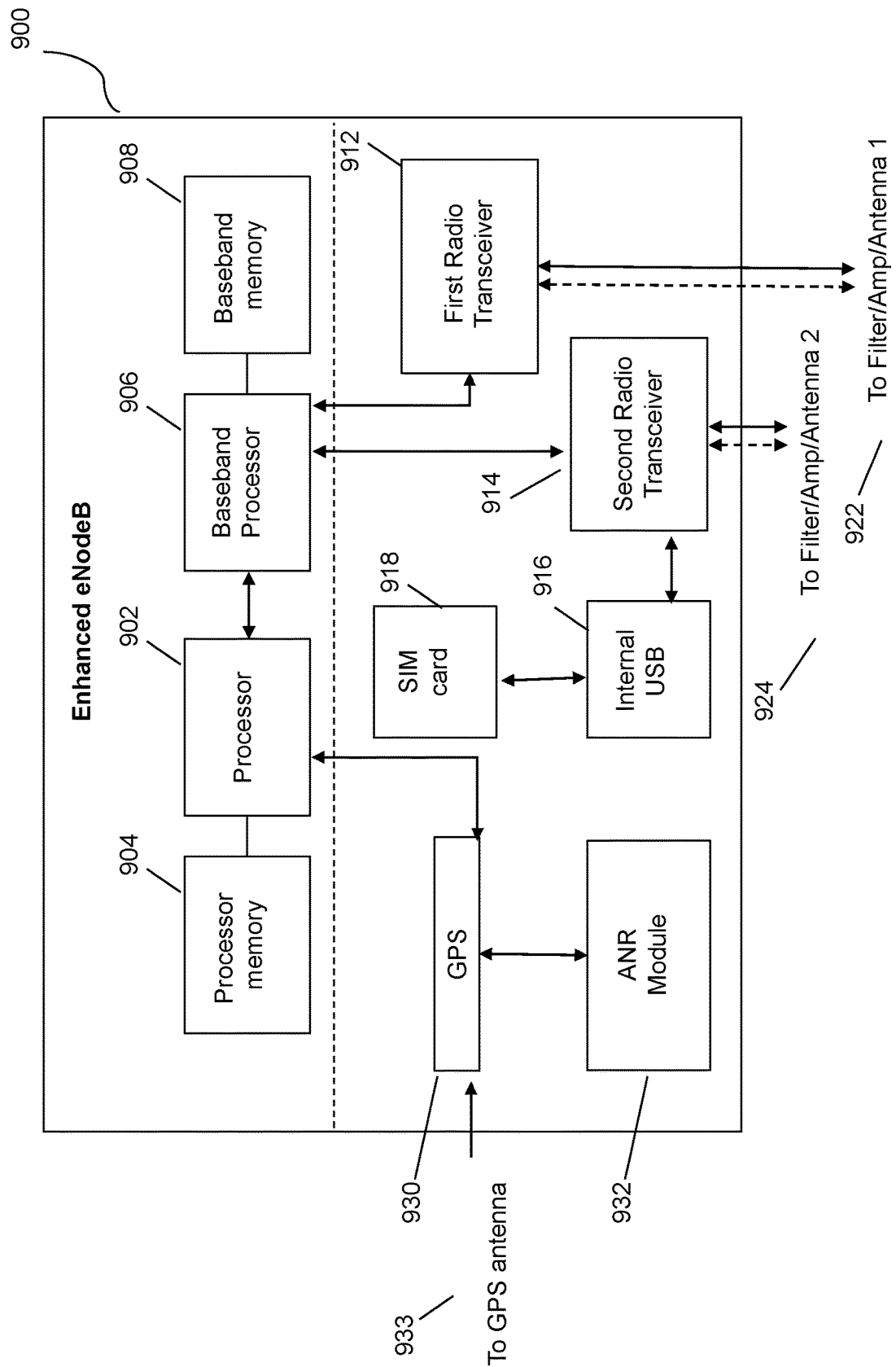
FIG. 9 is an enhanced eNodeB for performing the methods described herein, in accordance with some embodiments.

FIG. 9 is an enhanced eNodeB for performing the methods described herein, in accordance with some embodiments. eNodeB 900 may include processor 902, processor memory 904 in communication with the processor, baseband processor 906, and baseband processor memory 908 in communication with the baseband processor. Mesh network node 900 may also include first radio transceiver 912 and second radio transceiver 914, internal universal serial bus (USB) port 916, and subscriber information module card (SIM card) 918 coupled to USB port 916. In some embodiments, the second radio transceiver 914 itself may be coupled to USB port 916, and communications from the baseband processor may be passed through USB port 916. The second radio transceiver may be used for wirelessly backhauling eNodeB 900.

Processor 902 and baseband processor 906 are in communication with one another. Processor 902 may perform routing functions, and may determine if/when a switch in network configuration is needed. Baseband processor 906 may generate and receive radio signals for both radio transceivers 912 and 914, based on instructions from processor 902. In some embodiments, processors 902 and 906 may be on the same physical logic board. In other embodiments, they may be on separate logic boards.

Processor 902 may identify the appropriate network configuration, and may perform routing of packets from one network interface to another accordingly. Processor 902 may use memory 904, in particular to store a routing table to be used for routing packets. Baseband processor 906 may perform operations to generate the radio frequency signals for transmission or retransmission by both transceivers 910 and 912. Baseband processor 906 may also perform operations to decode signals received by transceivers 912 and 914. Baseband processor 906 may use memory 908 to perform these tasks.

The first radio transceiver 912 may be a radio transceiver capable of providing LTE eNodeB functionality, and may be capable of higher power and multi-channel OFDMA. The second radio transceiver 914 may be a radio transceiver capable of providing LTE UE functionality. Both transceivers 912 and 914 may be capable of receiving and transmitting on one or more LTE bands. In some embodiments, either or both of transceivers 912 and 914 may be capable of providing both LTE eNodeB and LTE UE functionality. Transceiver 912 may be coupled to processor 902 via a Peripheral Component Interconnect-Express (PCI-E) bus, and/or via a daughtercard. As transceiver 914 is for providing LTE UE functionality, in effect emulating a user equipment, it may be connected via the same or different PCI-E bus, or by a USB bus, and may also be coupled to SIM card 918. First transceiver 912 may be coupled to first radio frequency (RF) chain (filter, amplifier, antenna) 922, and second transceiver 914 may be coupled to second RF chain (filter, amplifier, antenna) 924.

SIM card 918 may provide information required for authenticating the simulated UE to the evolved packet core (EPC). When no access to an operator EPC is available, a local EPC may be used, or another local EPC on the network may be used. This information may be stored within the SIM card, and may include one or more of an international mobile equipment identity (IMEI), international mobile subscriber identity (IMSI), or other parameter needed to identify a UE. Special parameters may also be stored in the SIM card or provided by the processor during processing to identify to a target eNodeB that device 900 is not an ordinary UE but instead is a special UE for providing backhaul to device 900.

Wired backhaul or wireless backhaul may be used. Wired backhaul may be an Ethernet-based backhaul (including Gigabit Ethernet), or a fiber-optic backhaul connection, or a cable-based backhaul connection, in some embodiments. Additionally, wireless backhaul may be provided in addition to wireless transceivers 912 and 914, which may be Wi-Fi 802.11a/b/g/n/ac/ad/ah, Bluetooth, ZigBee, microwave (including line-of-sight microwave), or another wireless backhaul connection. Any of the wired and wireless connections described herein may be used flexibly for either access (providing a network connection to UEs) or backhaul (providing a mesh link or providing a link to a gateway or core network), according to identified network conditions and needs, and may be under the control of processor 902 for reconfiguration.

A GPS module 930 may also be included, and may be in communication with a GPS antenna 932 for providing GPS coordinates, as described herein. When mounted in a vehicle, the GPS antenna may be located on the exterior of the vehicle pointing upward, for receiving signals from overhead without being blocked by the bulk of the vehicle or the skin of the vehicle. Automatic neighbor relations (ANR) module 932 may also be present and may run on processor 902 or on another processor, or may be located within another device, according to the methods and procedures described herein.

Other elements and/or modules may also be included, such as a home eNodeB, a local gateway (LGW), a self-organizing network (SON) module, or another module. Additional radio amplifiers, radio transceivers and/or wired network connections may also be included.

Figure 10:
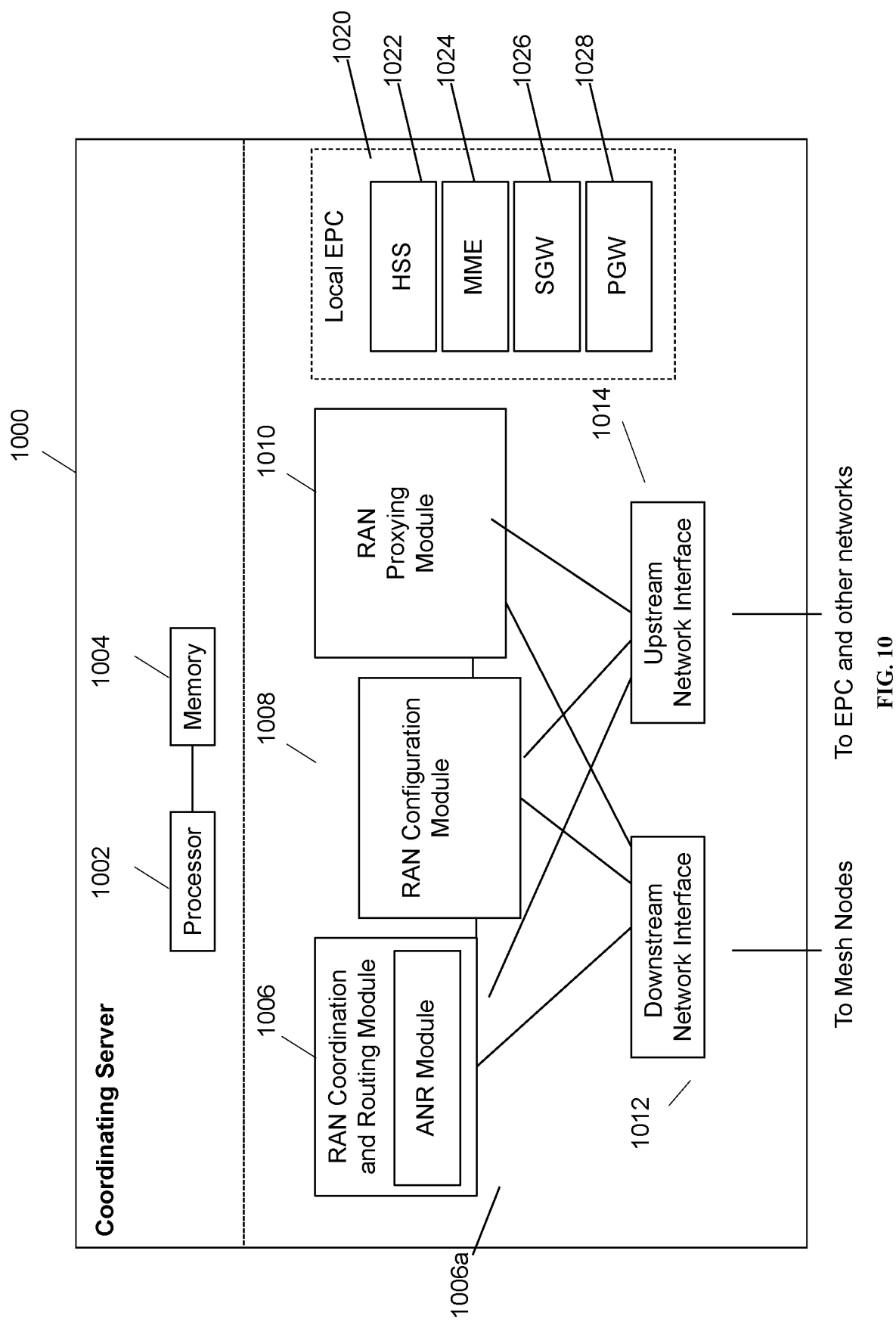
FIG. 10 is a coordinating server for providing services and performing methods as described herein, in accordance with some embodiments.

FIG. 10 is a coordinating server for providing services and performing methods as described herein, in accordance with some embodiments. Coordinating server 1000 includes processor 1002 and memory 1004, which are configured to provide the functions described herein. Also present are radio access network coordination/routing (RAN Coordination and routing) module 1006, including ANR module 1006a, RAN configuration module 1008, and RAN proxying module 1010. The ANR module 1006a may perform the ANR tracking, PCI disambiguation, ECGI requesting, and GPS coalescing and tracking as described herein, in coordination with RAN coordination module 1006 (e.g., for requesting ECGIs, etc.). In some embodiments, coordinating server 1000 may coordinate multiple RANs using coordination module 1006. In some embodiments, coordination server may also provide proxying, routing virtualization and RAN virtualization, via modules 1010 and 1008. In some embodiments, a downstream network interface 1012 is provided for interfacing with the RANs, which may be a radio interface (e.g., LTE), and an upstream network interface 1014 is provided for interfacing with the core network, which may be either a radio interface (e.g., LTE) or a wired interface (e.g., Ethernet).

Coordinator 1000 includes local evolved packet core (EPC) module 1020, for authenticating users, storing and caching priority profile information, and performing other EPC-dependent functions when no backhaul link is available. Local EPC 1020 may include local HSS 1022, local MME 1024, local SGW 1026, and local PGW 1028, as well as other modules. Local EPC 1020 may incorporate these modules as software modules, processes, or containers. Local EPC 1020 may alternatively incorporate these modules as a small number of monolithic software processes. Modules 1006, 1008, 1010 and local EPC 1020 may each run on processor 1002 or on another processor, or may be located within another device.

In any of the scenarios described herein, where processing may be performed at the cell, the processing may also be performed in coordination with a cloud coordination server. A mesh node may be an eNodeB. An eNodeB may be in communication with the cloud coordination server via an X2 protocol connection, or another connection. The eNodeB may perform inter-cell coordination via the cloud communication server, when other cells are in communication with the cloud coordination server. The eNodeB may communicate with the cloud coordination server to determine whether the UE has the ability to support a handover to Wi-Fi, e.g., in a heterogeneous network.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, or in various orders as necessary.

Although the above systems and methods for providing interference mitigation are described in reference to the Long Term Evolution (LTE) standard, one of skill in the art would understand that these systems and methods could be adapted for use with other wireless standards or versions thereof. The inventors have understood and appreciated that the present disclosure could be used in conjunction with various network architectures and technologies. Wherever a 4G technology is described, the inventors have understood that other RATs have similar equivalents, such as a gNodeB for 5G equivalent of eNB. Wherever an MME is described, the MME could be a 3G RNC or a 5G AMF/SMF. Additionally, wherever an MME is described, any other node in the core network could be managed in much the same way or in an equivalent or analogous way, for example, multiple connections to 4G EPC PGWs or SGWs, or any other node for any other RAT, could be periodically evaluated for health and otherwise monitored, and the other aspects of the present disclosure could be made to apply, in a way that would be understood by one having skill in the art.

Additionally, the inventors have understood and appreciated that it is advantageous to perform certain functions at a coordination server, such as the Parallel Wireless HetNet Gateway, which performs virtualization of the RAN towards the core and vice versa, so that the core functions may be statefully proxied through the coordination server to enable the RAN to have reduced complexity. Therefore, at least four scenarios are described: (1) the selection of an MME or core node at the base station; (2) the selection of an MME or core node at a coordinating server such as a virtual radio network controller gateway (VRNCGW); (3) the selection of an MME or core node at the base station that is connected to a 5G-capable core network (either a 5G core network in a 5G standalone configuration, or a 4G core network in 5G non-standalone configuration); (4) the selection of an MME or core node at a coordinating server that is connected to a 5G-capable core network (either 5G SA or NSA). In some embodiments, the core network RAT is obscured or virtualized towards the RAN such that the coordination server and not the base station is performing the functions described herein, e.g., the health management functions, to ensure that the RAN is always connected to an appropriate core network node. Different protocols other than S1AP, or the same protocol, could be used, in some embodiments.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

In some embodiments, the software needed for implementing the methods and procedures described herein may be implemented in a high level procedural or an object-oriented language such as C, C++, C#, Python, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, software that, when executed, causes a device to perform the methods described herein may be stored on a computer-readable medium such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

In some embodiments, the radio transceivers described herein may be base stations compatible with a Long Term Evolution (LTE) radio transmission protocol or air interface. The LTE-compatible base stations may be eNodeBs. In addition to supporting the LTE protocol, the base stations may also support other air interfaces, such as UMTS/HSPA, CDMA/CDMA2000, GSM/EDGE, GPRS, EVDO, 2G, 3G, 5G, TDD, or other air interfaces used for mobile telephony.

In some embodiments, the base stations described herein may support Wi-Fi air interfaces, which may include one or more of IEEE 802.11a/b/g/n/ac/af/p/h. In some embodiments, the base stations described herein may support IEEE 802.16 (WiMAX), to LTE transmissions in unlicensed frequency bands (e.g., LTE-U, Licensed Access or LA-LTE), to LTE transmissions using dynamic spectrum access (DSA), to radio transceivers for ZigBee, Bluetooth, or other radio frequency protocols, or other air interfaces.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, split across different devices, combined onto a single device, or substituted with those having the same or similar functionality.

Although the present disclosure has been described and illustrated in the foregoing example embodiments, it is understood that the present disclosure has been made only by way of example, and that numerous changes in the details of implementation of the disclosure may be made without departing from the spirit and scope of the disclosure, which is limited only by the claims which follow. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Features of one embodiment may be used in another embodiment.

The invention claimed is:

1. A method for identifying slow base stations and providing impact mitigation, the method comprising:
    detecting that a first base station, using a first queue, is slow, wherein a slow base station is a base station that that cannot keep up with a rate at which a core node is generating update messages over a prolonged period;
    providing a slow base station queue; and
    moving the first base station from the first queue to the slow base station queue.

2. The method of claim 1 further comprising determining the first base station has recovered and is no longer slow, and moving the first base station back to the first queue.

3. The method of claim 2 further comprising determining the slow base station queue is empty and deleting the slow base station queue.

4. The method of claim 1 wherein detecting the first base station is slow includes detecting the first base station cannot keep up with the rate at which a core node is generating update messages over a prolonged period due to packet loss on a link to a backhaul node.

5. The method of claim 1 wherein detecting the first base station is slow includes detecting the first base station cannot keep up with the rate at which a core node is generating update messages over a prolonged period due to a throughput of a link to a backhaul node is very low as compared to the traffic it's receiving.

6. The method of claim 1 wherein detecting the first base station is slow includes detecting the first base station cannot keep up with the rate at which a core node is generating update messages over a prolonged period due to the core node being heavily loaded in terms of CPU usage and cannot service an SCTP connection at a required frequency.

7. The method of claim 1 wherein detecting the first base station is slow includes detecting the base station has a full or nearly full message queue.

8. The method of claim 1 wherein detecting the first base station is slow includes detecting that the messages sent to this base station are getting queued up.

9. The method of claim 1 wherein detecting the first base station is slow includes detecting results from a very low number of messages pending for other nodes.

10. The method of claim 1 wherein detecting the slow base station includes detecting an indication that a Round Trip time (RTT) to the core node is unusually high.

11. A non-transitory computer-readable medium containing instructions for identifying slow base stations and providing impact mitigation, wherein the instructions cause a system to perform steps comprising:
    detecting that a first base station, using a first queue, is slow, wherein a slow base station is a base station that that cannot keep up with a rate at which a core node is generating update messages over a prolonged period;

providing a slow base station queue; and moving the first base station from the first queue to the slow base station queue.

12. The non-transitory computer-readable medium of claim 11 further comprising instructions for determining the first base station has recovered and is no longer slow, and moving the first base station back to the first queue.

13. The non-transitory computer-readable medium of claim 12 further comprising instructions for determining the slow base station queue is empty and deleting the slow base station queue.

14. The non-transitory computer-readable medium of claim 11 further comprising instructions wherein detecting the first base station is slow includes detecting the first base station cannot keep up with the rate at which a core node is generating update messages over a prolonged period due to packet loss on a link to a backhaul node.

15. The non-transitory computer-readable medium of claim 11 further comprising instructions wherein detecting the first base station is slow includes detecting the first base station cannot keep up with the rate at which a core node is generating update messages over a prolonged period due to a throughput of a link to a backhaul node is very low as compared to the traffic it's receiving.

16. The non-transitory computer-readable medium of claim 11 further comprising instructions wherein detecting the first base station is slow includes detecting the first base station cannot keep up with the rate at which a core node is generating update messages over a prolonged period due to the core node being heavily loaded in terms of CPU usage and cannot service an SCTP connection at a required frequency.

17. The non-transitory computer-readable medium of claim 11 further comprising instructions wherein detecting the first base station is slow includes detecting the base station has a full or nearly full message queue.

18. The non-transitory computer-readable medium of claim 11 further comprising instructions wherein detecting the first base station is slow includes detecting that the messages sent to this base station are getting queued up.

19. The non-transitory computer-readable medium of claim 11 further comprising instructions wherein detecting the first base station is slow includes detecting results from a very low number of messages pending for other nodes.

20. The non-transitory computer-readable medium of claim 11 further comprising instructions wherein detecting the slow base station includes detecting an indication that a Round Trip time (RTT) to the core node is unusually high.

* * * * *